(12) United States Patent  (10) Patent No.: US 8,600,646 B2
Haft et al.  (45) Date of Patent: Dec. 3, 2013

(54) METHOD FOR REGULATING AN AIR/FUEL RATIO AND METHOD FOR RECOGNIZING A FUEL QUALITY

(75) Inventors: Gerhard Haft, Obermotzing (DE); Paul Rodatz, Landshut (DE)

(73) Assignee: Continental Automotive GmbH, Hannover (DE)

( * ) Notice: Subject to any disclaimer, the term of this patent is extended or adjusted under 35 U.S.C. 154(b) by 492 days.

(21) Appl. No.: 12/988,593

(22) PCT Filed: Mar. 20, 2009

(86) PCT No.: PCT/EP2009/053310
§ 371 (c)(1),
(2), (4) Date: Oct. 19, 2010

(87) PCT Pub. No.: WO2009/130095
PCT Pub. Date: Oct. 29, 2009

(65) Prior Publication Data
US 2011/0040473 A1    Feb. 17, 2011

(30) Foreign Application Priority Data

Apr. 25, 2008  (DE) .......................... 10 2008 020 928

(51) Int. Cl.
*B60T 7/12*    (2006.01)
(52) U.S. Cl.
USPC .......................................... 701/103; 123/575
(58) Field of Classification Search
USPC .................... 701/103, 104; 123/672, 1 A, 575
See application file for complete search history.

(56) References Cited

U.S. PATENT DOCUMENTS

| | | | |
|---|---|---|---|
| 5,121,732 A | 6/1992 | Benninger et al. | 123/672 |
| 5,553,593 A * | 9/1996 | Schnaibel et al. | 123/682 |
| 5,881,703 A | 3/1999 | Nankee, II et al. | 123/686 |
| 5,908,463 A | 6/1999 | Akazaki et al. | 701/104 |
| 5,950,599 A | 9/1999 | Rotramel et al. | 123/436 |

(Continued)

FOREIGN PATENT DOCUMENTS

| | | | | |
|---|---|---|---|---|
| DE | 4117440 A1 | 12/1991 | | F02D 41/14 |
| EP | 1775584 A2 | 8/2006 | | G01N 33/28 |
| WO | 2005/108764 A1 | 7/2005 | | F02D 41/14 |

OTHER PUBLICATIONS

German Office Action, German Patent Application No. 102008020928.7-13, 2 pages, Jan. 14, 2009.

(Continued)

*Primary Examiner* — John Kwon
(74) *Attorney, Agent, or Firm* — King & Spalding L.L.P.

(57) ABSTRACT

In a method for regulating an air/fuel ratio, and in a method for recognizing a fuel quality, a lambda sensor is provided in the exhaust of the internal combustion engine, wherein after fueling of the tank the second adaption value is first adjusted due to a deviation of the lambda signal from the target signal occurring such that the lambda signal oscillates again about the target value, wherein the second adaption value is determined as a function of the current adaption value and as a function of the currently determined quality of the fuel. In a method for recognizing a fuel quality, particularly of a mixture ratio of two types of fuel, the lambda signal of the lambda sensor is analyzed for recognizing the quality.

19 Claims, 3 Drawing Sheets

(56) References Cited

U.S. PATENT DOCUMENTS

| | | | |
|---|---|---|---|
| 6,474,292 B1* | 11/2002 | Frenz et al. | 123/198 D |
| 6,474,323 B1* | 11/2002 | Beck et al. | 123/679 |
| 6,739,310 B2* | 5/2004 | Esteghlal et al. | 123/295 |
| 6,920,862 B2* | 7/2005 | Pott et al. | 123/299 |
| 7,367,223 B2 | 5/2008 | Kettl et al. | 73/53.05 |
| 2002/0195086 A1* | 12/2002 | Beck et al. | 123/435 |
| 2010/0198486 A1* | 8/2010 | Streib et al. | 701/104 |

OTHER PUBLICATIONS

Etxebarria, V., "Adaptive Control with a Forgetting Factor with Multiple Samples Between Parameter Adjustments" International Journal of Control, pp. 1189-1200; XP002103005, May 1, 1992.

International PCT Search Report and Written Opinion, PCT/EP2009/053310, 13 pages, Mailed Jul. 17, 2009.

* cited by examiner

FIG 4

| 1st adaptation value<br>E. content | | 1.955 | 9.945 | 11.985 | 73.015 | 75.055 | 83.045 | 85 |
|---|---|---|---|---|---|---|---|---|
| -10 | 0 | 0.999 | 2 | 2 | 2 | 0 | 0 | 0 |
| -5 | 0 | 0.751 | 1.5 | 0 | 0 | -0.5 | -0.25 | 0 |
| 0 | 0 | 0.5 | 0.999 | 0 | 0 | -0.999 | -0.5 | 0 |
| 5 | 0 | 0.25 | 0.5 | 0 | 0 | -1.5 | -0.751 | 0 |
| 10 | 0 | 0 | 0 | -2 | -2 | -2 | -0.999 | 0 |

METHOD FOR REGULATING AN AIR/FUEL RATIO AND METHOD FOR RECOGNIZING A FUEL QUALITY

CROSS-REFERENCE TO RELATED APPLICATIONS

This application is a U.S. National Stage Application of International Application No. PCT/EP2009/053310 filed Mar. 20, 2009, which designates the United States of America, and claims priority to German Application No. 10 2008 020 928.7 filed Apr. 25, 2008, the contents of which are hereby incorporated by reference in their entirety.

TECHNICAL FIELD

The invention relates to a method for regulating an air/fuel ratio and a method for recognizing a fuel quality, in particular a mixture ratio of two types of fuel.

BACKGROUND

A Flexible Fuel Vehicle (FFV) is a vehicle which can operate with a fuel mixture comprising a first and a second fuel. The first fuel is for example gasoline and the second fuel is for example ethanol. A gasoline/ethanol mixture is for example offered at appropriate filling stations, it being possible for the proportion of ethanol to lie between 0% and 100%. Depending on the composition of the fuel, a different quantity of fresh air is required for complete combustion of a predefined quantity of fuel.

To regulate the injection a lambda regulation is for example used, in order to achieve a combustion with a desired ratio between fuel and air. The lambda regulation must also take account here of the fuel mixture comprising a first and a second fuel. In the case of a fuel which for example consists only of gasoline, the air requirement of the fuel for a complete combustion is in the region of 14.6 kilograms of air per kilogram of fuel. In the case of a fuel which for example consists only of ethanol, only 9 kilograms of air are required per kilogram of ethanol for a complete combustion. Therefore it is necessary to know the mixture of the fuel, i.e. the proportion of the first and the proportion of the second fuel, in order to be able to adjust the ratio between fuel and air required for complete combustion. Furthermore it is known for changes occurring in the lambda signal to be assigned to a changed mixture of the fuel after fueling the vehicle. To this end a corresponding adaptation value is adjusted during the regulation such that the lambda signal again corresponds to a target value.

SUMMARY

According to various embodiments the fuel mixture can be recognized more reliably. Moreover, according to various embodiments, the method for combusting fuel through better recognition of the fuel mixture can be improved.

According to an embodiment, in a method for regulating the ratio between air and fuel during combustion in an internal combustion engine, fuel being provided in a tank, the quantity of the fuel and/or the quantity of the air is adjusted such that a desired air/fuel ratio is achieved, wherein to check the air/fuel ratio a lambda probe is provided in the exhaust gas of the internal combustion engine, wherein a lambda signal from the lambda probe is used to evaluate and regulate the air/fuel ratio, wherein the regulation is performed as a function of an adaptation value for the quality of the fuel and with the aid of a regulation value for the air/fuel ratio, wherein the adaptation value is adjusted after the tank is filled on the basis of a deviation from a target signal occurring in the lambda signal, such that the lambda signal again corresponds to the target signal, and wherein the adaptation value is determined as a function of the previous adaptation value and as a function of a correction factor.

According to a further embodiment, the correction factor can be a function of the previous quality of the fuel. According to a further embodiment, the correction factor can be a function of the previous adaptation value. According to a further embodiment, the quality of the fuel can be limited to a maximum value, wherein when a quality is recognized which lies above the maximum value, the quality of the fuel is limited to the maximum value. According to a further embodiment, an adaptation value can be used which has a first and a second adaptation value, wherein the second adaptation is a function of the fuel quality, wherein when a quality is recognized which lies above the maximum value, the first adaptation value is corrected. According to a further embodiment, a minimum value for the quality of the fuel can be limited to a minimum value, wherein when a quality is recognized which lies below the minimum value, the quality is set to the minimum value. According to a further embodiment, an adaptation value can be used which has a first and a second adaptation value, wherein the second adaptation value is a function of the fuel quality, wherein when a quality is recognized which lies below the minimum value, the first adaptation value is corrected. According to a further embodiment, when a quality of the fuel is recognized within a set value range around a predefined quality value it can be recognized that the tank is filled with the predefined quality value. According to a further embodiment, a minimum and/or a maximum quality value can be predefined.

According to another embodiment, in a method for recognizing a fuel quality, in particular a mixture ratio of two fuels, wherein to recognize the quality an operating parameter of the internal combustion engine, in particular a lambda signal from a lambda probe, is evaluated, a change in the operating parameter after fuel has been put in a fuel tank is used to recognize the fuel quality, wherein the quality of the fuel is determined as a function of a predefined quality for the fuel quality.

According to a further embodiment of the above method, the fuel quality can be limited to a predefined quality. According to a further embodiment of the above method, a predefined minimum quality can be used. According to a further embodiment of the above method, a predefined maximum quality can be used. According to a further embodiment of the above method, fuel put in a tank can be assigned to a predefined quality if the recorded quality lies in a predefined range of the predefined quality. According to a further embodiment of the above method, the predefined range deviates less than 20% from the predefined quality.

BRIEF DESCRIPTION OF THE DRAWINGS

The invention is explained further below on the basis of the figures, in which:

FIG. 4 shows a table containing adaptation values.

DETAILED DESCRIPTION

Figure 1:
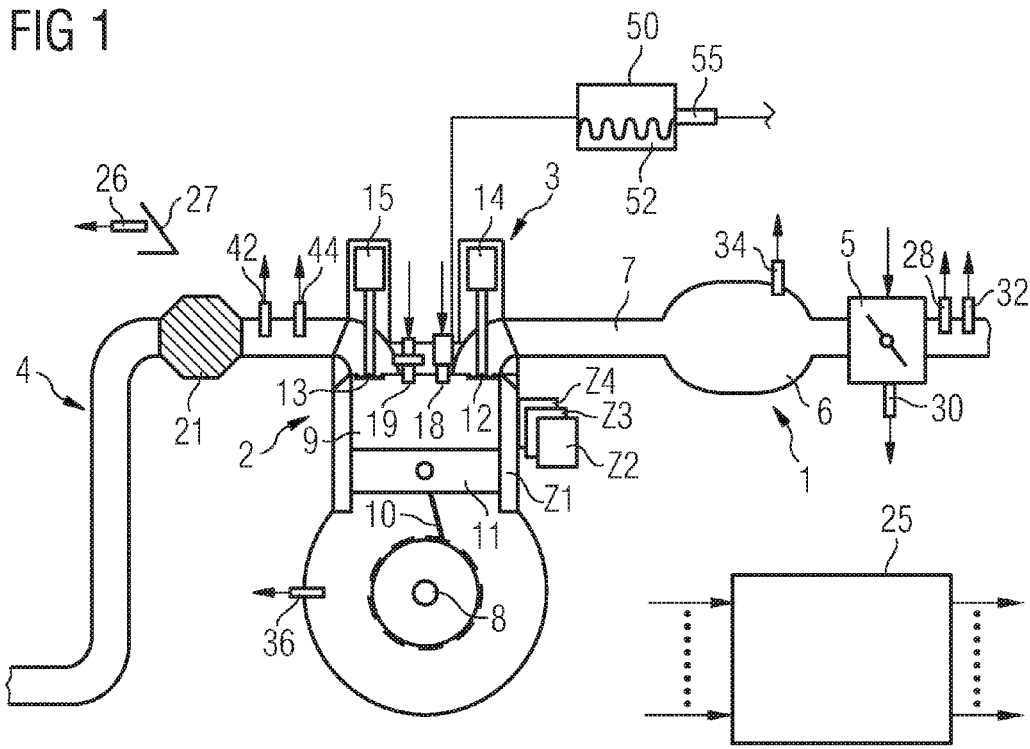
FIG. 1 shows a schematic representation of an internal combustion engine.

An improvement in the method for regulating the ratio between air and fuel is achieved in particular by a deviation occurring in the lambda signal being assigned to a target value of a changed fuel mixture after a fueling operation. To take account of the changed fuel mixture an adaptation value is adjusted, the previous adaptation value and a correction factor being used during the adaptation. The correction factor can depend on the previous quality of the fuel and/or on the previous adaptation value.

In a further embodiment a value for the quality of the fuel is predefined and the adjustment of the adaptation value on the basis of the quality of fuel put in the tank is limited as a function of the predefined value.

In a further embodiment the adjustment of the adaptation value on the basis of the quality of fuel put in the tank is limited to a maximum value when a fuel quality is recognized which lies above the maximum fuel quality. Moreover, in a further embodiment the adjustment of the adaptation value on the basis of the fuel quality is performed when the maximum quality is exceeded such that at least a part of the deviation in the lambda signal from the target signal is assigned to a first adaptation value which takes account of component tolerances.

In a further embodiment a minimum value for the quality of the fuel is predefined, and, when a quality is recognized which lies below the minimum quality, limits the adjustment of the adaptation value on the basis of the fuel quality. Moreover, in a further embodiment the adjustment of the adaptation value on the basis of the fuel quality is performed when the minimum quality is undershot such that at least a part of the deviation in the lambda signal from the target signal is assigned to a first adaptation value which takes account of component tolerances.

In a further embodiment, when a quality of fuel is recognized as being within a set value range near to a predefined quality value, the fact that fuel with a predefined quality value has been put in the tank is recognized. This method can be performed since fuel generally is sold with few set quality values. Thus when individual quality values are predefined the quality of the fuel can be assigned to one of the individual quality values. In some countries only fuels with two quality values are sold, so that an assignment is easily possible.

In a further embodiment the recognition of the fuel quality after fueling is determined as a function of the deviation in the lambda signal from a target signal and as a function of a predefined quality for the fuel quality. In this way a reliable determination of the fuel quality is achieved.

In a further embodiment the fuel quality is limited to a predefined quality. A minimum and/or a maximum quality can be used as a predefined quality. In this way it can be ensured that the quality of the fuel within the actually available quality on the market is recognized. As a result the recognition of the quality of the fuel is more reliable.

In a further embodiment the quality of the fuel is assigned to a predefined quality if the recognized quality of the fuel lies in a predefined range of the predefined quality. In a further embodiment the predefined range is 40% of the predefined fuel mixture or 40% of the first and/or second fuel contained. If for example a quality of the fuel with 20% ethanol and 80% gasoline is specified, then this quality is recognized if the determined proportion lies between 16% and 24% ethanol. In a further embodiment an adaptation value is used which has a first adaptation value and a second adaptation value. The second adaptation value takes account of the fuel quality. The first adaptation value takes account of a deviation from component tolerances which lead to a change in the predefined air/fuel ratio.

FIG. 1 shows an internal combustion engine with an intake tract 1, an engine block 2, a cylinder head 3 and an exhaust gas tract 4. The intake tract 1 preferably comprises a throttle valve 5, a manifold 6 and an intake manifold 7 which is routed to a cylinder Z1 via an inlet channel in a combustion chamber 9 of the engine block 2. The engine block 2 further comprises a crankshaft 8 which is coupled to a piston 11 of the cylinder Z1 via a connecting rod 10. The internal combustion engine comprises at least one cylinder Z1, but preferably further cylinders Z2, Z3, Z4. The internal combustion engine can be disposed in a motor vehicle, an aircraft or a rail vehicle. The cylinder head 3 comprises a valve train 14, 15 which is coupled to a gas inlet valve 12 and a gas outlet valve 13. The valve train 14, 15 comprises at least one camshaft which is coupled to the crankshaft 8. Furthermore an injection valve 18 and a sparkplug 19 are preferably disposed in the cylinder head 3. As an alternative to this, the injection valve 18 can also be disposed in the intake manifold 7. An exhaust gas catalytic converter 21 is disposed in the exhaust gas tract 4, and is preferably embodied as a 3-way catalytic converter. Furthermore a fuel tank 50 is provided, which is at least partially filled with a fuel mixture 52. The fuel mixture 52 is dosed into the combustion chamber 9 of the internal combustion engine for a combustion process. The dosing is preferably effected via the injection valve 18. The fuel mixture 52 comprises a first fuel and a second fuel. The first fuel is preferably gasoline. The second fuel is preferably alcohol, for example ethanol. The proportion of the second fuel is described by a proportional value of the alternative fuel and preferably lies between 0% and 100%.

A control device 25 is further provided, to which sensors are assigned which record different measured variables and in each case transmit the measured value to the control device 25. The control device 25 determines manipulated values as a function of at least one of the measured variables, said manipulated values then being converted in one or more actuating signals for controlling the actuators by means of corresponding adjustment drives. Operating variables of the internal combustion engine comprise the measured variables or variables derived from the measured variables.

The sensors are for example a pedal position sensor 26 which records a position of a gas pedal 27, an air mass meter 28 which records an air mass flow upstream of the throttle valve 5, a throttle valve sensor 30 which records a degree of opening of the throttle valve 5, a temperature sensor 32 which records a temperature of the intake air, a pressure sensor 34 which records an intake manifold pressure in the manifold 6, an angle sensor 36 which records a crankshaft angle, from which a speed of the internal combustion engine can be calculated.

Furthermore a lambda probe 42 is provided which is disposed upstream of the exhaust gas catalytic converter 21, in order for example to record the residual oxygen content of the exhaust gas, and the measured signal of which is characteristic of the air/fuel ratio during the combustion process in the combustion chamber 9 of the cylinder Z1. An exhaust gas temperature sensor 44 can be provided for recording an exhaust gas temperature. For a complete combustion of a predefined mass of fuel mixture in the combustion chamber 9 a mass of fresh air is necessary which depends on the percentage of mass of the first fuel and on the weight mass of the second fuel. Thus it is necessary to determine at least a proportion of the first or of the second fuel in the fuel mixture in order to be able to achieve a precise dosage between the injected fuel mixture mass and the introduced fresh air mass. Complete combustion contributes to a low-polluting operation of the internal combustion engine.

Figure 2:
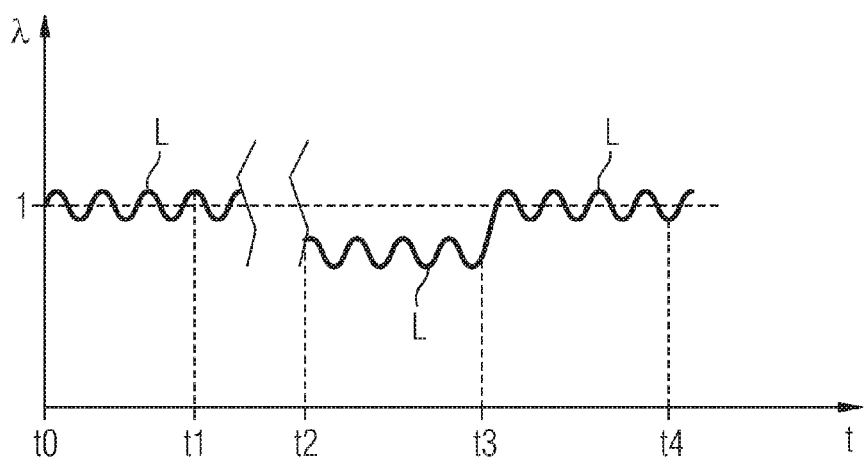
FIG. 2 shows a diagram of a temporal progression of a lambda probe signal.

FIG. 2 shows a diagram in which the lambda signal L from the lambda probe is plotted as a function of time t. The internal combustion engine is operated in the period between a zero-th time point $t_0$ and a first time point $t_1$ in a first operating phase in which the air/fuel ratio is set such that the lambda signal from the lambda probe oscillates around the value $\lambda=1$. To this end a regulation method is used which has a first adaptation value, a second adaptation value and for example an oscillating regulation parameter. The first adaptation value takes account of influences from the accuracy of the fuel dosing and/or the air dosing. The second adaptation value takes account of the fuel quality, i.e. the composition of the fuel mixture. The regulation parameter is predefined such that the lambda signal from the lambda probe oscillates around the value $\lambda=1$. The first and the second adaptation value are adjusted in longer periods ranging from minutes to days. The oscillating regulation parameter is adjusted in real time during the operation of the internal combustion engine, i.e. in the ms range. Instead of an oscillation other regulation methods can also be used which keep the $\lambda$ value in the desired range.

If the internal combustion engine is now restarted, as is the case at time point $t_2$, and it is established that the lambda signal L from the lambda probe has a fixed distance from the predefined target signal 10 of the lambda probe, i.e. the value $\lambda=1$, then either a deviation in a component tolerance in the injection system or a change in the fuel quality is recognized, for example by a fueling operation. The fueling operation can be recognized for example by comparing the fill level of the fuel tank before the internal combustion engine is switched off and the fill level after the internal combustion engine is started up. To this end a corresponding fill level sensor 55 is provided in the fuel tank and is connected to the control device 25.

If after a filling operation a corresponding deviation in the lambda signal from the target signal is recognized, then a determination of the mass-percent ratio of the first and/or of the second fuel is performed.

A determination of the mass-percent ratio of the first and/or of the second fuel can be performed for example with the aid of the lambda probe 42. To this end a lambda value is determined using the lambda probe 41. The lambda value is representative of the air/fuel ratio of the air/fuel mixture before the combustion process in the combustion chamber 9. The lambda probe 42 records a residual oxygen content of an exhaust gas of the internal combustion engine, from which contingently the air/fuel ratio before the combustion process is determined. As a function of the proportion of the second fuel the residual oxygen content of the exhaust gas changes, resulting in a change in the lambda signal. Thus as a function of the determined signal of the lambda probe the proportion of the second fuel can be inferred. To this end corresponding algorithms and/or tables are stored which show the relationship between the value of the lambda signal or of the deviation from the $\lambda 1$ value and the proportion of the first and/or of the second fuel.

The percentage of the second fuel is compared to predefined limit values. If the comparison shows that the determined percentage lies below a minimum limit value, the determined percentage is limited to the predetermined minimum limit value. The fuel quantity to be injected is calculated from the percentage of the second fuel and the resulting proportion of the first fuel by the control device and the air mass required for the combustion is calculated, and the throttle valve and/or the injection valve is triggered as appropriate. Moreover an adaptation value is set as a function of the set percentage of the second fuel.

Moreover a first adaptation value which is assigned to the function of the fuel system is adjusted. If a predefined limit value for the proportion of the second fuel is exceeded or undershot, the resulting deviation in the lambda signal cannot depend solely on the fuel mixture. To this end corresponding algorithms and/or tables are stored which set an adaptation of the first adaptation value as a function of the minimum and/or the maximum limit value and as a function of the percentage undershoot of the minimum and/or overshoot of the maximum limit value by the determined percentage of the second fuel.

In this way it is ensured that the air/fuel ratio is again adjusted during the combustion such that complete combustion occurs. This results in the lambda signal from the lambda probe again oscillating about the predefined target value in an operating phase, as is shown in FIG. 2 in the period between the third time point $t_3$ and the fourth time point $t_4$.

If the percentage of the second fuel determined on the basis of the deviation in the lambda signal shows that the proportion is larger than a predefined maximum proportion or smaller than a predefined minimum limit value, the determined proportion is limited to the predefined maximum or minimum proportion. On the basis of the maximum or minimum proportion a resultant maximum or minimum second adaptation value is determined and is taken into account during the regulation of the fuel/air mixture.

To fully equalize the deviation the first adaptation value is for example adjusted, in order to obtain the desired lambda value.

This method is based on the consideration that fixed mixture proportions of fuel are predefined in different countries. For example, a proportion of ethanol in the range between 0 and 85 percentage by mass of the fuel is laid down in the EU and in the USA. Further, a mixture percentage of between 22 and 100 percentage by mass of ethanol in the fuel is laid down in Brazil. In this way predefined values and in particular limit values for the mass-percent ratio of ethanol is laid down differently for different countries. A memory is provided in the control device 25 to save the predefined mixture proportions.

If a vehicle is fueled several times in succession with fuel whose quality, i.e. mass-percent ratio of the first and the second fuel, lies near a predefined value, in particular a maximum or minimum limit value, it is recognized that a fuel with the quality of the limit value has been put in the tank, but because of other errors, for example incorrect adaptation values, the right percentage of the first and the second fuel was not recognized.

In a further embodiment the first and/or the second adaptation value is calculated using the following formula A:

First/second adaptation value$_N$=first/second adaptation value$_{N-1}$+Correction factor, where the correction factor is a function of the second adaptation value, i.e. of the previous quality of the fuel and of the previous first adaptation value$_{N-1}$. The quality corresponds to the recognized mixture ratio between first and second fuel.

Here the index N designates the first/second adaptation value at the time point N and the index N−1 the first/second adaptation value at the preceding time point N−1. The characteristics map can for example be embodied such that no change in the first and second adaptation value occurs if the previously learned percentage of the second fuel lies at a predefined value, for example at 0% or 85% content for the USA and Europe or for example at 22% or 100% content for Brazil.

Furthermore, the characteristics map can be embodied such that a correction factor in the range near the limit values of the ethanol content results in second adaptation values which lie nearer to the assigned limit value after an adjustment of the adaptation value.

In a further embodiment the characteristics map can be embodied in an intermediate range such that only large or small second adaptation values which lie above or below a fixed threshold are reduced or increased.

Figure 3:
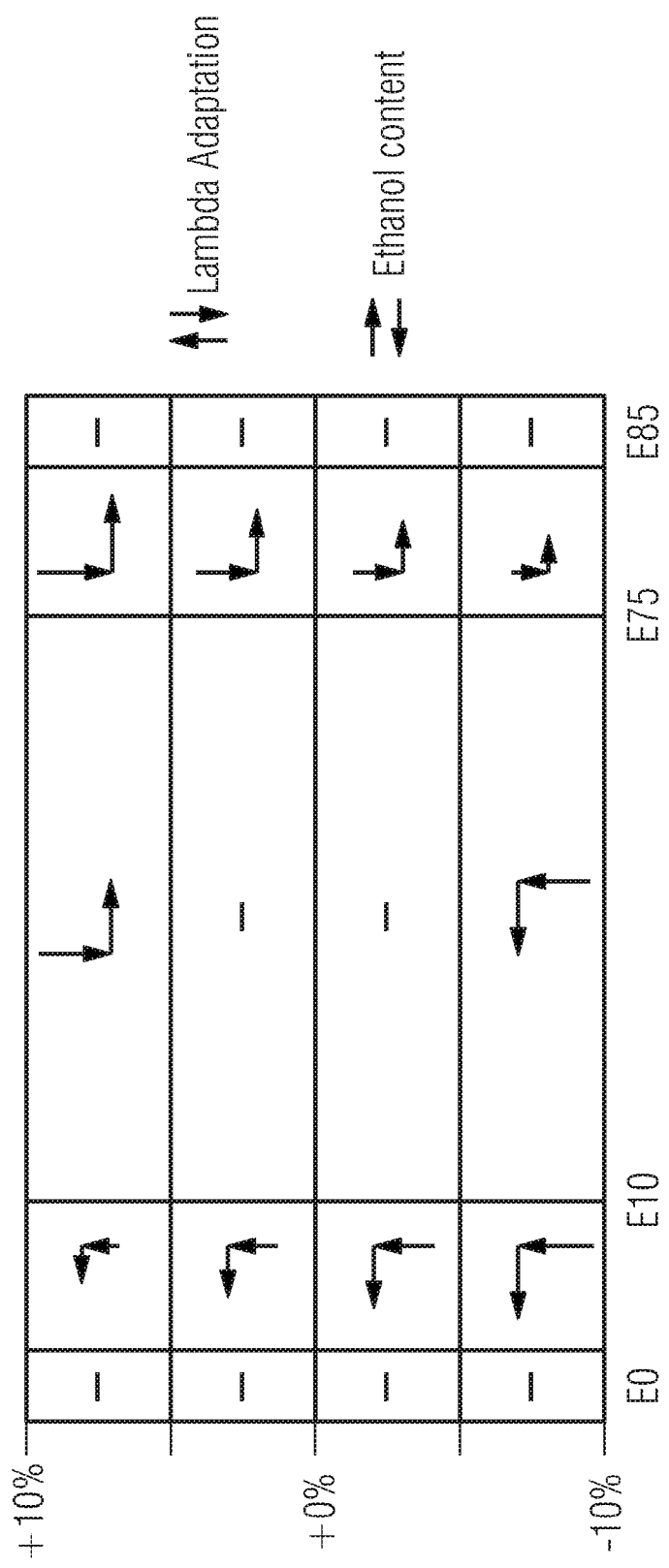
FIG. 3 shows a characteristics map for the adjustment of an adaptation value.

FIG. 3 shows a schematic representation of a characteristics map, in which the first adaptation value is shown in the range between +10% and −10% and a correction factor for the first and second adaptation value as a function of the learned mass-percent ratio for ethanol for $E_0$ for 0%, for $E_{10}$ for 10%, for $E_{75}$ for 75% and for $E_{85}$ for 85% ethanol in the fuel mixture is represented. The ethanol content corresponds to double the value of the second adaptation value. In the range between 0 and 3% ethanol the first and second adaptation value are not adjusted by the characteristics map. In the range between 3 and 10% ethanol a relatively large adjustment of the first and second adaptation value occurs. The adjustment of the first and second adaptation value is larger the more negative and smaller the first adaptation value is. In the range between 10% and 75% ethanol content no adjustment of the first and second adaptation value occurs in the range of +/−5% for the first adaptation value, and the correction factor has the value 0. In the range between −10% and −5% of the first adaptation value and in the range between 10% and 5% of the first adaptation value a large adjustment of the first and second adaptation value occurs for an ethanol content between 10% and 75%. In the range between 75% and 80% ethanol an adjustment of the first and second adaptation value occurs, with the adjustment being larger the larger a positive value of the first adaptation value and the smaller a negative value of the first and second adaptation value is. In the range above 85% of the proportion of ethanol no adjustment of the second adaptation value occurs.

FIG. 4 shows an example of explicit correction factors of a characteristics map for the adjustment of the first and second adaptation value as a function of the percentage of ethanol.

In the diagram, the learned ethanol percentages are given in the second line, and simultaneously correspond to double the second adaptation values. The ethanol contents shown are 1.955%, 9.945%, 11.985%, 73.015%, 75.055%, 83.045% and 85%. Thus the corresponding second adaptation values are: 0.977%; 4.972%; 5.992%; 36.507%; 37.527%; 41.522% and 42.5%.

In the first column on the left values for the first adaptation value are entered. The table now shows values for the correction factor as a function of the first adaptation value and as a function of the ethanol percentage, i.e. of the second adaptation value. The correction factor is used to calculate the first adaptation value in accordance with the formula A. Moreover the correction factor is used to calculate the second adaptation value and thus the ethanol content in accordance with the formula B:

Ethanol content$_N$=Ethanol content$_{N-1}$−($K$*(correction factor)), where K is a constant with the value 2, N the time point of the measurement and N−1 the time point of the preceding last measurement.

For example, with an ethanol percentage of 1.955% and a first adaptation value of −10 the correction factor is set at 0.999%. According to Formula A this gives the following first adaptation value$_N$:

first adaptation value$_N$=first adaptation value$_{N-1}$+correction factor=−10%+0.999%=−9.001.

For the ethanol content according to Formula B this gives:

Ethanol content$_N$=Ethanol content$_{N-1}$−($K$*(correction factor))=1.955%−(2*(0.999))=0;

Moreover, for example for an ethanol percentage of 9.945% and a first adaptation value of 0 a correction factor of 0.999 is set. Furthermore, for an ethanol percentage of 83.045% and a first adaptation value of −5% a correction factor of −0.25% is set.

To determine the percentage by volume of two types of fuel in a fuel other methods, for example irregular running methods, can be used instead of the described lambda-based method, and are described for example in U.S. Pat. No. 6,298,838 B1 or U.S. Pat. No. 5,950,599 A1.

What is claimed is:

1. A method for regulating the ratio between air and fuel during combustion in an internal combustion engine, comprising:
   burning fuel in the internal combustion engine, the fuel delivered from a tank,
   checking the exhaust gas of the internal combustion engine with a lambda probe,
   using a lambda signal from the lambda probe to evaluate a air/fuel ratio,
   regulating the air/fuel ratio based at least in part on a function of a first adaptation value for the quality of the fuel and a regulation value for the air/fuel ratio,
   setting a second adaptation value after the tank is filled on the basis of a deviation from a target signal occurring in the lambda signal, when the second adaptation value is applied the lambda signal again corresponds to the target signal, and
   determining the second adaptation value as a function of the first adaptation value and as a function of a correction factor.

2. The method according to claim 1, wherein the correction factor depends at least in part on a previous quality of the fuel.

3. The method according to claim 1, wherein the correction factor depends at least in part on the first adaptation value.

4. The method according to claim 1, wherein when a quality of the fuel is recognized which lies above a predetermined maximum value, the first adaptation value is set to the value corresponding to the predetermined maximum value for the quality of the fuel.

5. The method according to claim 4, wherein the second adaptation is a function of the fuel quality, and wherein when a quality is recognized which lies above the predetermined maximum value, the first adaptation value is corrected.

6. The method according to claim 1, wherein when a quality of the fuel is recognized which lies below a predetermined minimum value, the first adaptation value is set to the value corresponding to the predetermined minimum value for the quality of the fuel.

7. The method according to claim 6, wherein the second adaptation value is a function of the fuel quality, and wherein when a quality is recognized which lies below the predetermined minimum value, the first adaptation value is corrected.

8. The method according to claim 1, wherein when a quality of the fuel is recognized within a set value range around a predefined quality value it is recognized that the tank is filled with the predefined quality value.

9. The method according to claim 8, wherein a minimum and/or a maximum quality value is predefined.

10. A method for recognizing a fuel quality associated with a total quantity of fuel in a fuel tank, comprising:
  evaluating an operating parameter of the internal combustion engine corresponding to a lambda signal measured by a lambda probe disposed in an exhaust stream of the internal combustion engine,
  correlating the value of the operating parameter to one or more recognized fuel qualities, and
  using a change in the operating parameter after fuel has been added to the fuel tank to recognize a new fuel quality.

11. The method according to claim 10, wherein the fuel quality is limited to a predefined value.

12. The method according to claim 11, wherein a predefined minimum value is used.

13. The method according to claim 11, wherein a predefined maximum value is used.

14. The method according to claim 10, wherein fuel put in a tank is assigned to a predefined quality if the recorded quality lies in a predefined range of the predefined value.

15. The method according to claim 14, wherein the predefined range deviates less than 20% from the predefined quality.

16. A system for regulating the ratio between air and fuel during combustion in an internal combustion engine, comprising:
  a tank providing fuel for combustion in the internal combustion engine,
  a lambda probe arranged in the exhaust gas of the internal combustion engine, providing a lambda signal corresponding to an air/fuel ratio,
  wherein at least one of a quantity of the fuel and a quantity of the air is adjusted such that a desired air/fuel ratio is achieved, and
  a control unit operable:
    to use the lambda signal from the lambda probe to evaluate and regulate the air/fuel ratio,
    to perform the regulation as a function of an adaptation value for the quality of the fuel and with the aid of a regulation value for the air/fuel ratio,
    to adjust the adaptation value after the tank is filled on the basis of a deviation from a target signal occurring in the lambda signal, such that the lambda signal again corresponds to the target signal, and
    to determine the adaptation value as a function of the previous adaptation value and as a function of a correction factor.

17. The system according to claim 16, wherein the correction factor is a function of the previous quality of the fuel.

18. The system according to claim 16, wherein the correction factor is a function of the previous adaptation value.

19. The system according to claim 16, wherein the quality of the fuel is limited to a maximum value, wherein when a quality is recognized which lies above the maximum value, the quality of the fuel is limited to the maximum value.

* * * * *